United States Patent [19]

Landa et al.

[11] Patent Number: 4,785,327
[45] Date of Patent: Nov. 15, 1988

[54] PNEUMATIC CHARGE DIRECTOR DISPENSING APPARATUS

[75] Inventors: Benzion Landa, Edmonton, Canada; Haim Hochman, Ramat Gan; Yehuda Niv, Rehovot, both of Israel

[73] Assignee: Savin Corporation, Stamford, Conn.

[21] Appl. No.: 92,445

[22] Filed: Sep. 3, 1987

[51] Int. Cl.$^4$ ............................................. G03G 15/10
[52] U.S. Cl. ...................................... 355/10; 430/115
[58] Field of Search .................. 355/10; 118/659–662; 430/115, 117–119

[56] References Cited

U.S. PATENT DOCUMENTS

| | | | |
|---|---|---|---|
| 3,392,708 | 9/1966 | Hunstiger | 118/662 |
| 3,862,849 | 1/1975 | Kasuya | 355/104 |
| 4,614,699 | 9/1986 | Kitatani | 430/115 |

Primary Examiner—Arthur T. Grimley
Assistant Examiner—J. Pendegrass
Attorney, Agent, or Firm—Kenyon & Kenyon

[57] ABSTRACT

The disclosure is directed to liquid electrophotographic copying equipment and more particularly to an apparatus to dispense a liquid charge director composition to a reservoir that contains a liquid developer composition. Generally, the apparatus comprises a charge director reservoir including a pressure cell arranged below the liquid level of the charge director reservoir. The pressure cell has a volume to contain a predetermined amount of liquid charge director composition. The pressure cell is provided with an opening to permit a flow of liquid charge director composition from the charge director reservoir and into the interior of the pressure cell and vice versa. A tubular conduit extends from the interior of the pressure cell to the reservoir that contains the liquid developer composition to provide fluid communication therebetween. A controlled pulse of air is directed into the interior of the pressure cell to force all of the liquid charge director composition within the pressure cell from the pressure cell, with portions of the liquid charge director composition flowing through each of the opening and the tubular conduit. Pursuant to the invention, the ratio of the diameter of the opening to the diameter of the tubular conduit is fixed such that the controlled pulse of air causes a preselected amount of liquid charge director composition to flow through the tubular conduit and into the reservoir that contains the liquid developer composition and causes the remaining portion of the liquid charge director composition to flow through the opening and into the charge director reservoir.

8 Claims, 1 Drawing Sheet

PNEUMATIC CHARGE DIRECTOR DISPENSING APPARATUS

BACKGROUND AND SUMMARY OF THE INVENTION

The invention is directed to electrophotographic copying equipment and more particularly to an apparatus to pneumaticly dispense a small amount of charge director to a liquid developer reservoir.

In the operation of liquid electrophotographic copying equipment, a liquid developer composition or working dispersion is utilized in the process of producing hard copy on a given substrate using the information depicted on an original document. The working dispersion may comprise, e.g., a carrier liquid such as aliphatic, isomerized hydrocarbons, toner pigment particles dispersed throughout the carrier liquid and a charge director. The working dispersion is stored in a liquid developer reservoir mounted within the copying machine and is used in the electrophotographic copying process as required. Charge director is added to the carrier liquid to increase the conductivity of the working dispersion.

It has been determined, for example, that the addition of one drop of 10% charge director "soybean lecithin" to a liquid developer reservoir containing 800 grams of 1.5% weight by weight dispersion of toner particles within the carrier liquid will increase the conductivity of the liquid developer composition by approximately one picomho/cm. The smallest natural drop of charge director equals approximately 30 mg. which is equivalent to 40 $\mu$l. The size of a natural drop depends on the characteristics of the liquid and, therefore, provides good control over the amount of charge director dispensed into the working dispersion reservoir.

Accordingly, in order to take advantage of the control afforded by a natural drop, it is necessary to dispense a very small amount of charge director, e.g. 40 $\mu$l, to the reservoir to obtain the desired increase in conductivity of the liquid developer composition. Moreover, due to the nature of charge director, it is preferred that the dispensing mechanism should not have any moving parts within the charge director fluid. Furthermore, a charge director dispensing apparatus must be operable such that there is never any excessive flow of charge director in addition to the desired flow.

It is, therefore, a primary objective of the invention to provide an apparatus which is operable to dispense charge director in volumes as small as that of a single drop (i.e. 30–50 $\mu$l) to a liquid developer reservoir without any moving parts within the charge director fluid and without being subject to leakage, pressure or other effects which may result in additional charge director flow into the liquid developer reservoir. Generally, the apparatus of the invention comprises a charge director reservoir including a pressure cell structure submerged below the liquid level of the charge director reservoir. The cell structure is of a small volume. If dispensing of a single drop is desired, the cell volume should be approximately 100 $\mu$l, sufficient to hold approximately three drops of charge director. An opening is formed in the cell structure whereby charge director flows naturally from the reservoir through the opening and into the cell structure.

Pursuant to the invention, a first hollow tube is arranged to extend from within the cell structure to the liquid developer reservoir to permit a pressure controlled flow of charge director from the cell structure to the liquid developer reservoir. The tube is configured relative to the cell structure and liquid developer reservoir such that there ordinarily is not any flow between the cell structure and liquid developer reservoir due to gravity or fluid levels. A second hollow tube extends from the cell structure to a source of pulsed air.

Pursuant to a significant feature of the invention, a controlled pulse of air is pumped through the second hollow tube from a source remote from the charge director reservoir to cause a fluid pressure effect upon the charge director within the cell structure resulting in an outward flow of the small amount of charge director through each of the opening of the cell structure and the first hollow tube. The ratio of the diameter of the opening to the diameter of the first hollow tube determines the amount of charge director that will flow out of each of the opening and first hollow tube. In accordance with the invention, the ratio is fixed such that the pulsed air causes the desired volume of charge director to flow through the first hollow tube and into the liquid developer reservoir, and the residual volume of the cell to flow through the opening of the cell. It has been found that the flow ratio is not a function of the duration of the air pulse. It has also been found that there is a minimal duration of the air pulse needed in order to dispense the desired amount of charge director. The minimal duration is determined empirically and is generally a function of the pressure of the air pulse and the length of the first hollow tube. However, the liquid volume thus dispensed into the liquid developer reservoir is almost independent of any increase of the air pulse duration beyond the required minimum.

Pursuant to the preferred embodiment of the invention, an electrical control device is operable to activate the pulsed air pump to dispense the charge director to the liquid developer compositions reservoir. The electrical control device may be selectively activated by a conductivity sensor which monitors the conductivity of the working dispersion within the liquid developer reservoir to determine when charge director is to be added to the reservoir.

Pursuant to another feature of the invention, the liquid developer reservoir is provided with a fluid circulation device to circulate the liquid developer composition within the reservoir. In this manner, the amount of charge director dispensed to the reservoir is readily and evenly dispersed throughout the liquid developer composition due to the circulation of the liquid developer. The thorough mixing of the dispensed amount of charge director and liquid developer composition achieves the desired increase in the conductivity of the liquid developer composition.

Thus, the invention provides a highly advantageous means for accurately dispensing a very small and controlled amount of charge director to a liquid developer reservoir. The volume of the cell structure together with the pressure of the pulsed air and the ratios of the diameters of the opening, first and second tubes may be determined with great accuracy to assuredly provide as small as one drop flow of charge director into the liquid developer reservoir. In addition, the pneumatic dispenser is operable with no moving parts within the charge director reservoir inasmuch as the charge director flow is caused solely by a controlled pulsed air directed to within the cell structure from a remote source.

For a better understanding of the above and other features and advantages of the invention reference should be made to the following detailed description of a preferred embodiment of the invention and to the accompanying drawings.

DETAILED DESCRIPTION

Figure 1:
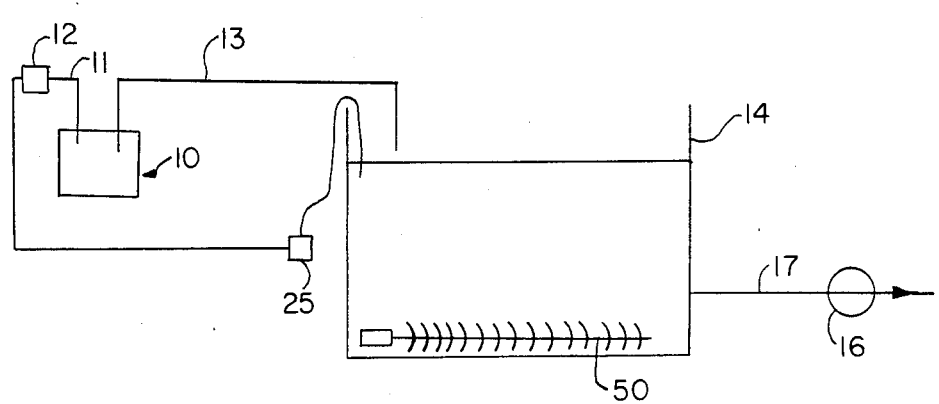
FIG. 1 is a side view of a liquid developer reservoir of a liquid electrophotographic copying machine including a pneumatic charge director dispensing apparatus built in accordance with the invention.

Referring now to the drawings and initially to FIG. 1, there is illustrated a pneumatic charge director dispensing apparatus generally indicated by the reference numeral 10. The dispensing apparatus 10 is connected by a tube 11 to a source of controlled, pulsed air 12, as will be described in more detail below, and includes a tube 13 for dispensing a small amount, e.g. as small as one drop, of charge director to a reservoir 14 containing a liquid developer composition comprising of about 1.5% weight by weight disperion of toner particles in the carrier liquid. The reservoir 14 is connected to a pipe 17. A pump 16 is operable to controlably deliver liquid developer composition through the pipe 17 for use in a liquid electrophotographic copying machine as is well known in the art.

Figure 2:
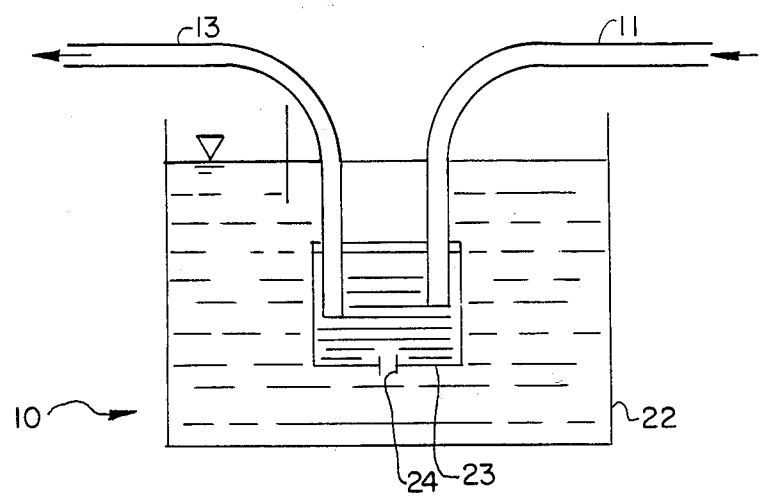
FIG. 2 is an enlarged side cross sectional view of the pneumatic charge director dispensing apparatus illustrated in FIG. 1.

In accordance with a specific embodiment of the invention, the pneumatic charge director dispensing apparatus 10 is operated to dispense a small pre-determined amount of charge director to the liquid developer composition to increase the conductivity of the composition, as discussed above. Referring now to FIG. 2, the device 10 comprises a charge director reservoir 22 to contain and store a preselected quantity of liquid charge director composition. Supported within the charge director reservoir 22 at a position which is generally below the liquid level of the charge director composition is a pressure cell 23 including an opening 24 to provide flow communication between the charge director reservoir 22 and the interior of the pressure cell 23. In this manner, the liquid charge director composition will flow naturally from the reservoir 22 through the opening 24 and into the pressure cell 23. In one specific embodiment of the invention, when the desired dispensed volume is only one drop of liquid, the volume of the pressure cell 23 is approximately 100 μl or three drops of charge director liquid.

Pursuant to the invention, the tube 11 extends from the source of controlled, pulsed air 12 to within the pressure cell 23. The tube 13 is arranged to extend from within the pressure cell 23 to the liquid developer reservoir 14. When the pulsed air pump 12 is off, the liquid charge director composition flows from the reservoir 22, through the opening 24 and into the pressure cell 23 until the pressure cell 23 is filled with the liquid charge director composition. An electrical control and conductivity sensor 25 is operable to monitor the conductivity of the working dispersion within the reservoir 14 and to activate the source of pulsed air 12 at a preselected level of conductivity to dispense the charge director to the reservoir 14.

Upon activation of the source of pulsed air 12, a single, controlled pulse of air is forced through the tube 11 and into the pressure cell 23. The pressure effect of the pulse of air causes the charge director composition to be forced out of the pressure cell 23 through each of the opening 24 and the tube 13. It has been determined that the amount of charge director that flows out of the tube 13 as opposed to out of the opening 24 is a function of the ratio of the diameter of the opening 24 to the diameter of the tube 13. The ratio is selected such that the amount of charge director flowing through the tube 13 is the desired predetermined quantity of charge director with the remainder of the charge director flowing out of the opening 24 and back into the charge director reservoir 22. The pressure of the air pulse is sufficient to purge the tube 13 and thereby force the predetermined amount of charge director completely through the tube 13 and into the liquid developer composition reservoir 14. After the pulse duration has lapsed, the charge director composition will once again flow from the charge director reservoir 22 and into the pressure cell 23 via the opening 24.

As discussed above, a single drop of charge director, when added to 800 grams of 1.5% dispersion of toner particles in the carrier liquid, increases the conductivity of the working dispersion by one picomho/cm. For larger sized working dispersion reservoirs, larger amounts than one drop may be dispensed to the working dispersion to achieve the desired increase in conductivity. For example, 80 microliters of charge director may be dispensed to a 1600 gram tank and so on. Of course, this can be achieved by either applying a sequence of two blasts of pulsed air to a 100 μl pressure cell 23 or a single air pulse to a larger size cell 23. In the first case, the two blasts of pulsed air are timed sufficiently apart to permit the natural charge director flow, through the opening 24 to refill the pressure cell 23 in between blasts of air.

The diameters of tubes 11 and 13 are chosen in accordance with the surface tension of the charge director liquid so as to prevent fluid flow through the tubes 11 and 13 absent the air pulse from the source of pulsed air 12. The amount of charge director that enters the tube 13 due to the pressure effect of the air pulse is caused to flow completely through the tube 13 to the liquid developer solution reservoir 14. At all other times, air fills both tubes 11, 13 which together with the surface tension of the charge director within the pressure cell 23, prevents any leakage of charge director composition from the charge director reservoir 22.

Referring once again to FIG. 1, a venetion blind type screen 50 is mounted at the bottom of the liquid developer reservoir 14 and is arranged to be reciprocated through a work stroke to circulate the liquid developer composition within the reservoir 14. The circulation of the liquid developer composition will cause a thorough mixing of the dispensed liquid charge director composition and the liquid developer composition. Of course, any other suitable form of circulation means may be utilized to circulate the liquid developer composition throughout the reservoir 14 to mix the liquid charge director composition.

In the preferred embodiment of the invention, the diameter of the opening 24 is 0.8 mm, the diameter of the tube 11 is 1.0 mm, the diameter of the tube 13 is 1.0 mm, and the pressure of the air pulse is 0.05 atmospheres. The above recited dimensions and pressure have been found to be suitable to effectively dispense one drop of charge director to a working dispersion reservoir.

The present invention provides a highly advantageous means to accurately dispense a very small quantity of charge director to a liquid developer solution reservoir of a liquid electrophotographic copying machine. The pneumatic discharge is effective to dispense as small an amount as 30–50 μ of charge director, which is approximately the volume of a natural drop of charge director. The utilization of a natural drop volume affords good control over the discharge due to surface tension and other characteristics of the charge director composition which naturally cause the formation of 30–50 μl of charge director into a drop configuration. In addition, the volume of charge director contained in a natural drop is effective to achieve a meaningful increase in the conductivity of liquid developer solution contained in a reservoir of typical commercial dimensions, e.g., an 800 g solution capacity. The pneumatic means of the invention provides a predetermined discharge of charge director without the use of any moving parts within the charge director reservoir and the charge director flow occurs only during the period of pulsed air flow into the pressure cell.

What is claimed is:

1. In a liquid electrophotographic copying machine, an apparatus to dispense a preselected amount of a liquid charge director composition to a reservoir that contains a liquid developer composition, which apparatus comprises:
   (a) a charge director reservoir that contains a liquid charge director composition;
   (b) a pressure cell arranged within the charge director reservoir below the liquid level of the liquid charge director composition;
   (c) said pressure cell including an opening having a first preselected diameter to permit a flow of liquid charge director composition from said charge director reservoir and into the interior of said pressure cell and vice versa;
   (d) a controlled source of pulsed air;
   (e) a first tubular conduit having a second preselected diameter and connecting said controlled source of pulsed air to the interior of said pressure cell;
   (f) a second tubular conduit having a third preselected diameter and providing a fluid flow path from the interior of said pressure cell to said reservoir that contains a liquid developer composition; and
   (g) control means to selectively activate said source of pulsed air to discharge a pulse of air having a preselected pressure through said first tubular conduit and into the interior of said pressure cell; said preselected pressure being sufficient to force all of the liquid charge director composition within said pressure cell from said pressure cell, with portions of said liquid charge director composition flowing through each of the opening and the entire length of said second tubular conduit;
   (h) the ratio of the first preselected diameter to the third preselected diameter being fixed such that the preselected air pressure causes said preselected amount of liquid charge director composition to flow through the entire length of said second tubular conduit and into said reservoir that contains a liquid developer composition and causes the remaining portion of said liquid charge director composition to flow through said opening and into said charge director reservoir.

2. The apparatus according to claim 1 and further means to circulate said liquid developer composition to cause a thorough mixing of said liquid developer composition and said preselected amount of dispensed liquid charge director composition.

3. The apparatus according to claim 1, further characterized by said control means including a conductivity sensor to monitor the conductivity of the liquid developer composition.

4. The apparatus according to claim 2, further characterized by said means to circulate comprising a venetion blind type screen arranged within said liquid developer reservoir and operable to reciprocate through a work stroke to circulate the liquid developer composition.

5. In a liquid electrophotographic copying machine, an apparatus to dispense a preselected amount of a liquid charge director composition to a reservoir that contains a liquid developer composition, which apparatus comprises:
   (a) a charge director reservoir that contains a liquid charge director composition;
   (b) a pressure cell arranged within the charge director reservoir below the liquid level of the liquid charge director composition;
   (c) said pressure cell having a predetermined volume and including an opening having a first preselected diameter to permit a flow of liquid charge director composition from said charge director reservoir and into the interior of said pressure cell and vice versa;
   (d) a controlled source of pulsed air;
   (e) first conduit means arranged to provide a fluid flow path between said controlled source of pulsed air and the interior of said pressure cell;
   (f) second conduit means having a second preselected diameter and providing a fluid flow path between the interior of said pressure cell and said reservoir that contains a liquid developer composition; and
   (g) control means to selectively activate said source of pulsed air to discharge a pulse of air having a preselected pressure through said first conduit means and into the interior of said pressure cell; said preselected air pressure being sufficient to force all of the liquid charge director composition within said pressure cell from said pressure cell, with portions of said liquid charge director composition flowing through each of the opening and the entire length of said second conduit means;
   (h) the ratio of said first preselected diameter to said second preselected diameter being fixed such that the preselected air pressure causes said preselected amount of liquid charge director composition to flow through the entire length of said second conduit means and into said reservoir that contains a liquid developer composition and causes the remaining portion of said liquid charge director composition to flow through said opening and into the charge director reservoir.

6. The apparatus according to claim 5, further characterized by means to circulate said liquid developer composition to cause a thorough mixing of said liquid developer composition and said preselected amount of dispensed liquid charge director composition.

7. The apparatus according to claim 5 wherein said preselected amount of charge director is 30–50 microliters.

8. The apparatus according to claim 7 wherein the volume of said pressure cell is approximately 100 microliters.

* * * * *